Patented Oct. 25, 1949

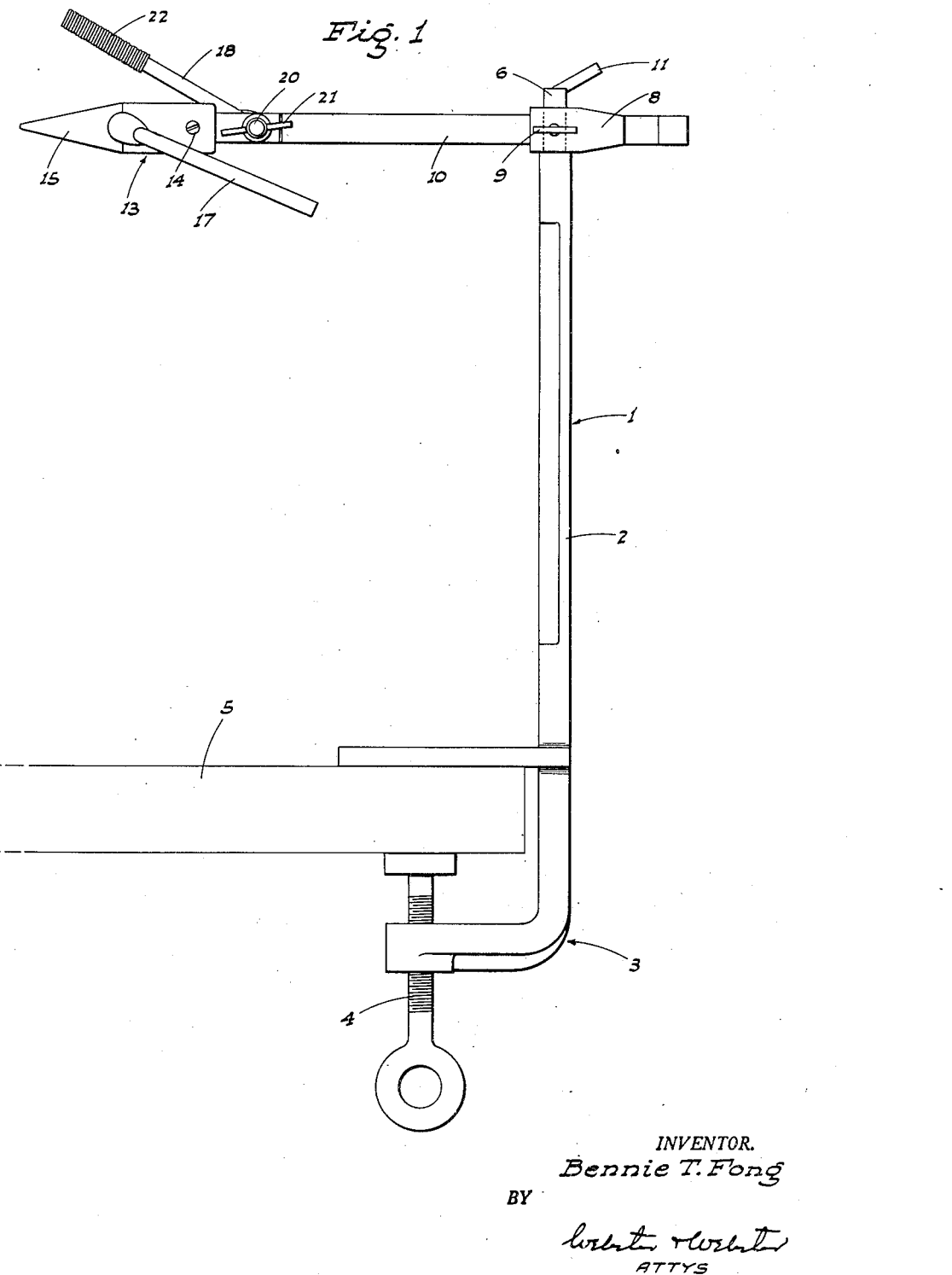

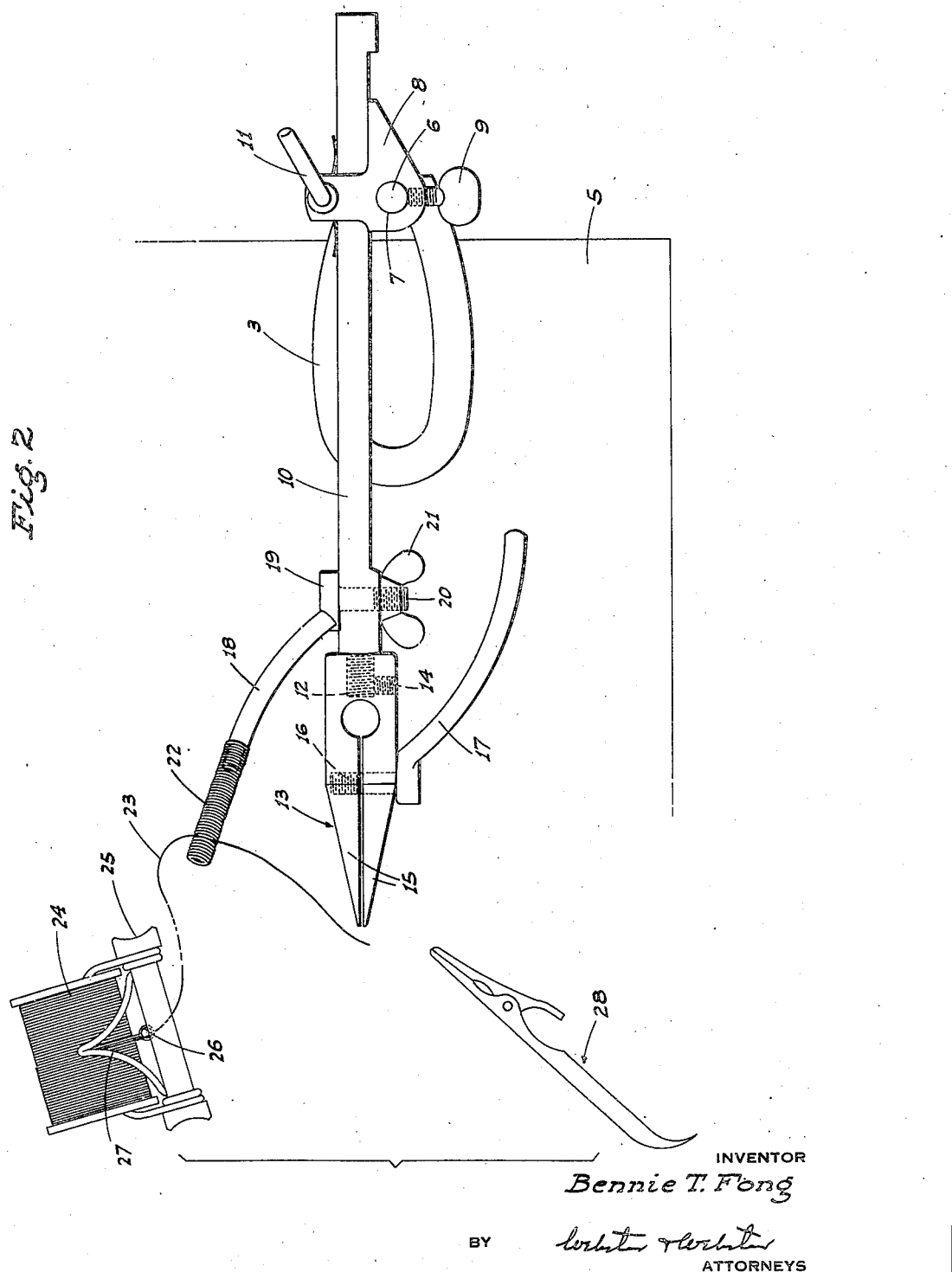

2,486,142

UNITED STATES PATENT OFFICE 2,486,142

FISH FLY MAKING VISE AND HOLDER

Bennie T. Fong, Lodi, Calif

Application January 21, 1947, Serial No. 723,409

1 Claim. (Cl. 43—1)

This invention has for an object the provision of a novel fish fly tying vise and holder adapted to secure said vise to a bench or table for use.

It is also an object of the present invention to provide a fish fly tying vise which comprises an arm supported vise adapted to clampingly engage the hook, and an adjustably mounted rigid finger associated with the vise and fitted with novel means to frictionally but releasably grip the thread being used to wind or tie the fly; said means being a closely coiled helical spring secured to the free end and projecting beyond said finger.

Another object of the invention is to adjustably mount the vise by means of a table attached holder or bracket which includes an upstanding post, there being a horizontal arm to one end of which the vise is attached, and an attachment head securing the arm adjacent its other end to the post for adjustment of the direction and extent of projection of said arm and the vise so that the latter can be selectively positioned for convenience of use.

A further object of the invention is to provide a simple, practical, and convenient fish fly making vise and holder, and yet one which will be exceedingly effective for the purpose for which it is designed.

These objects are accomplished by means of such structure and relative arrangement of parts as will fully appear by a perusal of the following specification and claim.

In the drawings:

Fig. 1 is a side elevation of the improved fish fly tying vise and its holder or bracket.

Fig. 2 is a plan view of the device, as in use.

Referring now more particularly to the characters of reference on the drawings, the numeral 1 indicates generally the holder or bracket 1, said bracket including an upstanding post 2 having a laterally opening C-clamp 3 on its lower end. The C-clamp 3 includes a hand screw 4, whereby said clamp, together with the post 2, may be firmly secured to an edge portion of a bench or table 5.

The bracket 1, in addition to its purpose in the present invention, is also intended for use as one of the cooperative parts of the sportsman's device shown in copending applications, Serial Nos. 723,408 and 723,410, the latter of which is now Patent No. 2,466,801, April 12, 1949.

At its upper end the post 2 is formed with a vertical, stub spindle 6, which projects through a vertical bore 7 of an attachment head 8. A hand screw 9 threads through the attachment head 8 and bears against the spindle 6, whereby to secure said head in selective positions of rotative adjustment.

To one side of the vertical bore 7 the attachment head 8 is formed with a horizontal bore, through which one end portion of a horizontal arm 10 extends in slidably adjustable relation, whereby to regulate the extent of projection of said arm. The arm 10 is normally held against sliding through the attachment head 8 by means of a holding screw 11 passing through a split portion of said head adjacent the arm 10.

By the above described arrangement the arm 10 can be adjusted, as to its direction and extent of projection, at the selection of the user.

At its outer or free end the horizontal arm 10 is formed with a forwardly projecting neck 12, which is threaded into the rear end of an outwardly projecting fly tying vise, indicated generally at 13. A set screw 14 prevents accidental unthreading of the neck 12 from the rear end of the vise 13.

The vise 13 is of one-piece construction and includes longitudinal spring jaws 15 controlled by a clamping screw 16 extending therebetween; said clamping screw having a hand lever 17 radiating therefrom. By manipulation of the lever 17, the jaws 15 may be opened or closed.

Directly to the rear of the vise 13 the arm 10 is fitted with a rigid, normally upwardly and outwardly diverging finger 18. The finger 18, at its inner end, is adjustably attached to the arm 10 by a head 19 having a threaded shank 20 projecting through said arm and carrying a wing nut 21 on the opposite side thereof.

At its free end the finger 18 is fitted with an outwardly projecting, closely coiled helical spring 22.

When the device is in use it is assembled in the manner described, with a hook, to be tied, engaged in the vise between the jaws 15 thereof.

The fly tying thread 23 leads from a spool 24 disposed in a spool holder 25, through an eye 26 included in said holder. The holder 25 also includes a brake finger 27 which prevents overrunning of said spool. From the eye 26 the thread 23 leads to the helical spring 22, whence said thread is engaged, intermediate its ends, frictionally between adjacent coils of said spring. In this manner a free end portion of the thread is supported adjacent the vise 13 for use.

When a fly is being tied, the hackles are held by a pair of hackle holding pliers, indicated generally at 28, and said free end portion of the thread 23 is used to tie or affix said hackles to the vise supported hook.

The above described device provides a very practical and easy-to-use vise for the tying of fish flies. When the device is not in use the several parts may be detached for storage in compact relationship.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

In combination with an adjustable arm supporting a vise disposed thereon and co-axially therewith, a finger mounted on the arm rearwardly of the vise and projecting forwardly at an angle to but generally in the same direction as the vise and spaced laterally of the vise, a coiled spring fitted on the outer end of the finger co-axially therewith, the coils of the spring projecting beyond the end of the finger whereby a portion of the spring may flex laterally with respect to the axis of the finger.

BENNIE T. FONG.

REFERENCES CITED

The following references are of record in the file of this patent:

UNITED STATES PATENTS

| Number | Name | Date |
|---|---|---|
| 345,990 | Reyher | July 20, 1886 |
| 373,362 | Hamilton | Nov. 15, 1887 |
| 459,637 | Lee | Sept. 15, 1891 |
| 476,754 | Mendelson | June 7, 1892 |
| 1,305,321 | Tooker | June 3, 1919 |
| 1,684,951 | Dowdall | Sept. 18, 1928 |
| 2,166,585 | Evans | July 18, 1939 |
| 2,236,781 | Pannier | Apr. 1, 1941 |